(12) United States Patent
Stumbe et al.

(10) Patent No.: US 8,236,905 B2
(45) Date of Patent: Aug. 7, 2012

(54) HYPERBRANCHED POLYMERS HAVING ETHYLENICALLY UNSATURATED GROUPS

(75) Inventors: Jean-Francois Stumbe, Strasbourg (FR); Bernd Bruchmann, Freinsheim (DE); Dietmar Haering, Schriesheim (DE); Yvonne Heischkel, Mannheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1737 days.

(21) Appl. No.: 10/575,342

(22) PCT Filed: Oct. 8, 2004

(86) PCT No.: PCT/EP2004/011254
§ 371 (c)(1),
(2), (4) Date: Apr. 11, 2006

(87) PCT Pub. No.: WO2005/037893
PCT Pub. Date: Apr. 28, 2005

(65) Prior Publication Data
US 2007/0027269 A1 Feb. 1, 2007

(30) Foreign Application Priority Data
Oct. 14, 2003 (DE) .................. 103 48 463

(51) Int. Cl.
*C08L 67/06* (2006.01)
*C08F 299/04* (2006.01)
*C08F 265/04* (2006.01)
(52) U.S. Cl. ......... 525/439; 525/445; 528/296; 528/306
(58) Field of Classification Search .............. 525/445
See application file for complete search history.

(56) References Cited

U.S. PATENT DOCUMENTS

| | | | |
|---|---|---|---|
| 4,082,710 A * | 4/1978 | Vrancken et al. | 524/714 |
| 4,983,712 A * | 1/1991 | Meixner et al. | 528/272 |
| 5,183,862 A | 2/1993 | Figuly | |
| 5,543,232 A * | 8/1996 | Ehrhart et al. | 428/482 |
| 5,566,027 A * | 10/1996 | Saitoh et al. | 359/796 |
| 5,616,630 A * | 4/1997 | Heinze | 522/96 |
| 5,834,118 A | 11/1998 | Rånby et al. | |
| 6,316,517 B1 * | 11/2001 | Dones et al. | 522/143 |
| 6,562,464 B1 | 5/2003 | Schwalm et al. | |

FOREIGN PATENT DOCUMENTS

| | | |
|---|---|---|
| DE | 196 18 720 | 11/1998 |
| DE | 198 26 712 | 12/1999 |
| DE | 199 13 353 | 9/2000 |
| DE | 100 38 617 | 2/2002 |
| EP | 0 007 508 | 6/1983 |
| EP | 0 057 474 | 10/1984 |
| EP | 0 495 751 | 7/1992 |
| EP | 1 110 946 | 6/2001 |
| EP | 0 615 980 | 12/2001 |
| EP | 1 338 610 | 8/2003 |
| WO | 93/17060 | 9/1993 |
| WO | 96/13558 | 5/1996 |
| WO | 96/19537 | 6/1996 |
| WO | 97/49781 | 12/1997 |
| WO | 98/33761 | 8/1998 |
| WO | 00/59982 | 10/2000 |
| WO | 00/64975 | 11/2000 |
| WO | 00/77070 | 12/2000 |
| WO | WO 0232982 A1 * | 4/2002 |

OTHER PUBLICATIONS

Flory, Paul J., "Molecular Size Distribution in Three Dimensional Polymers. VI. Branched Polymers Containing A-R-$B_{f-1}$ Type Units", J. Am. Chem. Soc., vol. 74, pp. 2718-2723, 1952.
Faber, Kurt, "Biotransformations in Organic Chemistry", Springer Verlag, S. 345-356, 1997.
Sunder, Alexander, et al., "Controlling the Growth of Polymer Trees: Concepts and Perspectives for Hyperbranched Polymers", Chem. Eur. J., vol. 6, No. 14, pp. 2499-2506, 2000.
U.S. Appl. No. 09/332,980, filed Jun. 15, 1999, Beck, et al.

* cited by examiner

*Primary Examiner* — Randy Gulakowski
*Assistant Examiner* — Mike M Dollinger
(74) *Attorney, Agent, or Firm* — Oblon, Spivak, McClelland, Maier & Neustadt, L.L.P.

(57) ABSTRACT

Hyperbranched polyesters containing ethylenically unsaturated groups and obtainable by reacting
(c) at least one compound having at least one ethylenic double bond
with at least one hyperbranched polyester obtainable by condensing
(a) at least one dicarboxylic acid or derivative thereof with at least one at least trifunctional alcohol
or
(b) at least one tricarboxylic or higher polycarboxylic acid or derivative thereof with at least one diol.

17 Claims, No Drawings

HYPERBRANCHED POLYMERS HAVING ETHYLENICALLY UNSATURATED GROUPS

The present invention relates to hyperbranched polyesters containing ethylenically unsaturated groups and obtainable by reacting
(c) at least one compound having at least one ethylenic double bond
    with at least one hyperbranched polyester obtainable by condensing
(a) at least one dicarboxylic acid or derivative thereof with at least one at least trifunctional alcohol
    or
(b) at least one tricarboxylic or higher polycarboxylic acid or derivative thereof with at least one diol.

The present invention additionally relates to a process for preparing hyperbranched polyesters containing unsaturated groups and to the use of the hyperbranched polyesters containing unsaturated groups, thus obtained, as binders, such as in radiation-curable compositions, in for example coatings, paints and paint systems, adhesives, and printing inks.

Modified high-functionality hyperbranched polyesters and polyester-based dendrimers are known per se (see for example WO 96/19537) and are already being used in certain applications, as an impact modifier, for example. Dendrimers, however, are too expensive for many applications, since the syntheses impose exacting requirements on yields of the buildup reactions and on purity of the intermediates and end products, and require reagents too expensive for large-scale industrial use.

WO 93/17060 discloses a process for preparing dendrimeric polyesters. A polyol starter molecule, trimethylolpropane for example, is reacted with dimethylolpropionic acid in an amount such as to give a first-generation dendrimer. Dendrimers of higher generations are formed by stepwise addition of dimethylolpropionic acid. The polyester obtained can subsequently be functionalized further. The process disclosed is very inconvenient and does not allow much flexibility.

In WO 00/64975 the strictly dendrimeric polyester Boltorn® H20 is reacted with acrylic acid and a polyfunctional alcohol having a molecular weight of not more than 2000 g/mol and is used in coating formulations.

WO 00/59982 describes the reaction of polyesters referred to as hyperbranched with, for example, glycidyl methacrylate (see p. 9). From the description it is evident, however, that WO 00/59982 understands hyperbranched polyesters to embrace first-generation oligomers of dendrimeric construction (page 1 line 31 et seq.).

The synthesis of dendrimeric polyesters is, as described above, inconvenient and lacking in flexibility. In many cases the performance properties of the modified dendrimers are in need of improvement too.

It is an object of the present invention to provide new polyesters containing unsaturated groups. A further object is to provide a process for preparing polyesters containing unsaturated groups that avoids the disadvantages known from the prior art. Another object is to provide uses for polyesters containing unsaturated groups.

We have found that these objects are achieved by the hyperbranched polyesters defined at the outset, containing unsaturated groups.

Hyperbranched polyesters in the sense of the present invention are molecularly and structurally non uniform. By virtue of their molecular and structural non uniformity they differ from dendrimers, which are structurally and molecularly uniform in construction.

Hyperbranched polyesters of the invention, containing ethylenically unsaturated groups, are obtainable by reacting at least one hyperbranched polyester itself obtainable by condensing
(a) at least one dicarboxylic acid or derivative thereof with at least one at least trifunctional alcohol
    or
(b) at least one tricarboxylic or higher polycarboxylic acid or derivative thereof with at least one diol
    with (c) at least one compound having at least one ethylenic double bond.

Dicarboxylic acids of version (a) include, for example, oxalic, malonic, succinic, glutaric, adipic, pimelic, suberic, azelaic, sebacic, undecane-α,ω-dicarboxylic, dodecane-α,ω-dicarboxylic, cis- and trans-cyclohexane-1,2-dicarboxylic, cis- and trans-cyclohexane-1,3-dicarboxylic, cis- and trans-cyclohexane-1,4-dicarboxylic, cis- and trans-cyclopentane-1,2-dicarboxylic, and cis- and trans-cyclopentane-1,3-dicarboxylic acids,
the aforementioned dicarboxylic acids being unsubstituted or substituted by one or more radicals selected from
$C_1$-$C_{10}$ alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl or n-decyl,
$C_3$-$C_{12}$ cycloalkyl groups, such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl and cycloheptyl;
alkylene groups such as methylene or ethylidene; or
$C_6$-$C_{14}$ aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, more preferably phenyl.

Exemplary representatives of substituted dicarboxylic acids include the following: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Further included among dicarboxylic acids of version (a) are ethylenically unsaturated acids such as maleic acid and fumaric acid and also aromatic dicarboxylic acids such as phthalic, isophthalic or terephthalic acid.

Mixtures of two or more of the aforementioned representatives may also be used.

Dicarboxylic acids can be used either as such or in the form of derivatives.

By derivatives are meant preferably:
the corresponding anhydrides in monomeric or polymeric form,
monoalkyl or dialkyl esters, preferably monomethyl or dimethyl esters or the corresponding monoethyl or diethyl esters, but also the monoalkyl and dialkyl esters derived from higher alcohols such as n-propanol, isopropanol, n-butanol, isobutanol, tert-butanol, n-pentanol and n-hexanol,
and additionally monovinyl and divinyl esters, and also mixed esters, preferably methyl ethyl esters.

In the context of the present invention it is also possible to use a mixture of a dicarboxylic acid and one or more of its derivatives. It is likewise possible in the context of the present invention to use a mixture of two or more different derivatives of one or more dicarboxylic acids.

Particular preference is given to using succinic, glutaric, adipic, phthalic, isophthalic and/or terephthalic acid or their monomethyl or dimethyl esters. Very particular preference is given to using adipic acid.

At least trifunctional alcohols of version (a) include the following: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols such as mesoerythritol, threitol, sorbitol and mannitol, for example; or mixtures of the above at least trifunctional alcohols. Glycerol oligomers are suitable as well, of the formula III

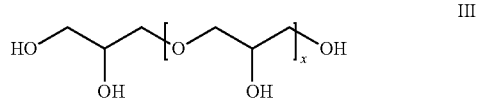

for example, where x is an integer from 1 to 10, preferably from 1 to 5 and more preferably 2 to 3. Mixtures of different glycerol oligomers and of glycerol oligomers with glycerol are also suitable of course.

Additionally suitable are polyetherpolyols obtainable by ethoxylating and/or propoxylating compounds having at least 3 groups which contain acidic hydrogen atoms. Preference is given to ethoxylation.

Examples of compounds having at least 3 groups containing acidic hydrogen atoms include alcohols, especially saturated alcohols containing at least 3 OH groups, such as glycerol, trimethylolethane, trimethylolpropane, ditrimethylolpropane or pentaerythritol. It is also possible, however, to use suitable amines or amino alcohols, such as diethanolamine, dipropanolamine, diisopropanolamine, triethanolamine, tris(hydroxymethyl)aminomethane or diisopropylethanolamine.

The degree of ethoxylation is normally between 0.1 and 10 ethylene oxide units per group containing acidic hydrogen. Preference is given to from 1 to 6 units and particular preference to from 2 to 5 units. The number-average molecular weight $M_n$ of the polyetherpolyols used is normally between 100 and 1000 g/mol. Preference is given to using ethoxylated trimethylolpropane, ethoxylated glycerol or ethoxylated pentaerythritol.

Also suitable are star-shaped molecules having at least 3 arms made up of PPO-PEO blocks.

Preference is given to glycerol, triglycerol, trimethylolpropane, trimethylolethane and pentaerythritol.

Examples of tricarboxylic or polycarboxylic acids of version (b) include 1,2,4-benzenetricarboxylic acid, 1,3,5-benzenetricarboxylic acid, 1,2,4,5-benzenetetracarboxylic acid, and mellitic acid.

Tricarboxylic or polycarboxylic acids can be used in the reaction of the invention either as they are or else in the form of derivatives.

By derivatives are meant preferably
the corresponding anhydrides in monomeric or polymeric form,
monoalkyl, dialkyl or trialkyl esters, preferably monomethyl, dimethyl or trimethyl esters or the corresponding monoethyl, diethyl or triethyl esters, and also monoesters, diesters and triesters derived from higher alcohols such as n-propanol, isopropanol, n-butanol, isobutanol, tert-butanol, n-pentanol or n-hexanol, and also monovinyl, divinyl or trivinyl esters, and additionally mixed methyl ethyl esters.

In the context of the present invention it is also possible to use a mixture of a tricarboxylic or polycarboxylic acid and one or more of its derivatives. It is likewise possible in the context of the present invention to use a mixture of two or more different derivatives of one or more tricarboxylic or polycarboxylic acids.

Examples of diols in the sense of version (b) of the present invention include ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, 2-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H, or mixtures of two or more representatives of the aforementioned compounds, n being an integer and $100 > n \geqq 4$. One or both hydroxyl groups in the abovementioned diols may also be replaced by SH groups, as in mercaptoethanol, for example. Preference is given to ethylene glycol, propane-1,2-diol, propane-1,3-diol, butane-1,4-diol, hexane-1,6-diol, and diethylene glycol, triethylene glycol, dipropylene glycol, and tripropylene glycol.

The molar ratio of hydroxyl to carboxyl groups in versions (a) and (b) is from 2:1 to 1:2, in particular from 1.5:1 to 1:1.5.

At least trifunctional alcohols of version (a) may have hydroxyl groups each of equal reactivity.

At least trifunctional alcohols of version (a) may also, however, have hydroxyl groups having at least two chemically different reactivities.

The basis for the difference in reactivity of the hydroxyl groups may be either chemical (e.g., primary/secondary/tertiary OH group) or steric. Preference is given here to compounds which are also reactive with acid groups and whose OH groups are initially of equal reactivity but in which, by reaction with at least one acid group, it is possible to induce a drop in reactivity, based on steric or electronic influences, among the remaining OH groups. This is the case for example when using trimethylolpropane or pentaerythritol.

For example, the triol can be a triol having primary and secondary hydroxyl groups; a preferred example is glycerol.

In version (a) it is possible to use at least trifunctional alcohol in the form of an alcohol mixture having an average hydroxyl functionality of greater than 2.

In version (b) it is also possible to use tricarboxylic or higher carboxylic acid in the form of a carboxylic acid mixture having an average COOH functionality of more than 2.

Compounds having at least one ethylenic double bond are preferably compounds having a terminal ethylenic double bond, i.e., one of the two carbon atoms of the C—C double bond carries only hydrogen atoms as substituents. Compounds containing ethylenically unsaturated double bond can be, for example, ethylenically unsaturated carboxylic acids, unsaturated alcohols, unsaturated amines, and, in particular, unsaturated carboxylic esters.

Examples of compounds having at least one ethylenic double bond are compounds of the formula Ia or Ib

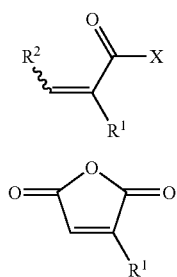

where:

$R^1$ is selected from unbranched or branched $C_1$-$C_{10}$ alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl and n-decyl; preferably $C_1$-$C_4$ alkyl such as methyl, ethyl, n-propyl, isopropyl, n-butyl, isobutyl, sec-butyl and tert-butyl;

or hydrogen, very preferably hydrogen and methyl;

$R^2$ is selected from unbranched or branched $C_1$-$C_{10}$ alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl and n-decyl; preferably $C_1$-$C_4$ alkyl such as methyl, ethyl, n-propyl, isopropyl, n-butyl, isobutyl, sec-butyl and tert-butyl;

COOH, $C_2$-$C_6$ alkenyl, such as —CH=CH$_2$, syn-CH=CH—CH$_3$ and anti-CH=CH—CH$_3$, and very preferably hydrogen.

X is selected from halogen, such as F, Br, I and, in particular, Cl, and O—$R^3$, where $R^3$ is selected from hydrogen or unbranched or branched $C_1$-$C_{10}$ alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl and n-decyl; preferably $C_1$-$C_4$ alkyl such as methyl, ethyl, n-propyl, isopropyl, n-butyl, iso-butyl, sec-butyl and tert-butyl;

unbranched or branched $C_1$-$C_{10}$ alkyl with at least one functional group such as —OH, —SH, —NH$_2$, —NH—$C_1$-$C_{10}$ alkyl, —NH—CO—$C_1$-$C_{10}$ alkyl, in particular 2-hydroxyethyl, 2-aminoethyl, 2-mercaptoethyl, 3-hydroxypropyl, 3-aminopropyl, ω-hydroxy-n-butyl and ω-amino-n-butyl, polyethylene glycol derivatives of the formula —(CH$_2$—CH$_2$—O)$_n$—H, where n is an integer from 2 to 100, preferably up to 50 and more preferably up to 10, polypropylene glycol derivatives of the formula —[CH(CH$_3$)—CH$_2$—O]$_n$—H, where n is as defined above, glycidyl;

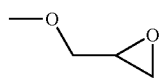

H—CO (formyl) or unbranched or branched $C_1$-$C_{10}$ alkyl-CO, such as acetyl, propionyl, n-butyroyl, n-valeroyl, and $C_6$-$C_{10}$ aryl-CO such as α-naphthoyl, β-naphthoyl and, in particular, benzoyl.

Other examples of compounds having at least one ethylenic double bond are unsaturated carboxylic acids having 3 to 30 carbon atoms and from 1 to 5 C—C double bonds, such as linoleic acid, linolenic acid, ricinoleic acid, erucic acid (cis-CH$_3$(CH$_2$)$_7$CH=CH—(CH$_2$)$_{11}$—COOH), oleic acid, eleostearic acid (cis,trans,trans-9,11,13-octadecatrienoic acid), unsaturated carboxylic acids having 3 to 30 carbon atoms and from 1 to 5 C—C double bonds in a mixture with saturated carboxylic acids; such mixtures are available, for example as natural or modified natural oils, such as linseed oil, soybean oil, sunflower oil, safflower oil, castor oil and dehydrogenated castor oil;

unsaturated alcohols having 3 to 40 carbon atoms and from 1 to 5 C—C double bonds, such as allyl alcohol, hex-1-en-3-ol, hex-2-en-1-ol; and unsaturated amines having 3 to 20 carbon atoms and from 1 to 5 C—C double bonds, such as allylamine and hex-1-ene-3-amine.

Also suitable are diol and polyol ethers in which at least one hydroxyl group is etherified with an unsaturated alcohol and at least one hydroxyl group is unetherified, examples being trimethylolpropane diallyl ether, trimethylolpropane monoallyl ether and 1,6-hexanediol monovinyl ether, it being possible for further hydroxyl groups to be etherified with saturated alcohols.

Also suitable are diol and polyol esters in which at least one hydroxyl group is esterified with an unsaturated acid and at least one hydroxyl group is unesterified, it being possible for further hydroxyl groups to be esterified with saturated acids, examples being pentaerythrityl tri(meth)acrylate, pentaerythritol triallyl ether and pentaerythrityl di(meth)acrylate monostearate.

Mention may also be made of vinyl esters such as vinyl acetate and vinyl propionate, for example.

Mention may also be made of diene and triene monoepoxides such as butadiene monoepoxide, for example.

Mention may also be made of unsaturated halides having 2 to 20 carbon atoms and from 1 to 5 C—C double bonds, such as vinyl chloride, allyl chloride and allyl bromide, for example.

Mention should also be made of isocyanato (meth)acrylates, as disclosed in for example DE-A 100 38 617 and EP-A 1 110 946, particularly reaction products of di- or triisocyanates such as toluene diisocyanate, isophorone diisocyanate, hexamethylene diisocyanate, diphenylmethane diisocyanate (see formula),

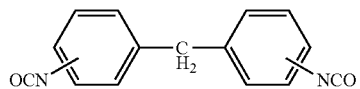

with compounds of the formula II

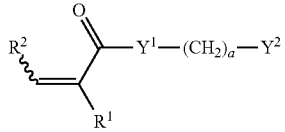

where in formula II $R^1$ and $R^2$ are as defined above and the other variables are defined as follows:

a is an integer from 2 to 20, preferably from 2 to 4,
$Y^1$ is selected from oxygen, sulfur and NH,
$Y^2$ is selected from —OH, —SH and $NH_2$.

Preferred isocyanato (meth)acrylates are

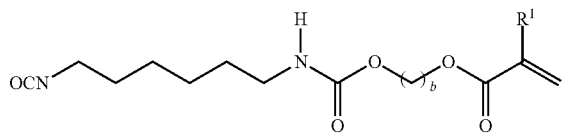

where $R^1$ is as defined above, and in particular is hydrogen or methyl, and b is an integer from 2 to 6, in particular from 2 to 4.

Mention may also be made of unsaturated halogenated silanes, preference being given to $ClSi(CH_2CH=CH_2)_3$.

Mention may also be made of unsaturated amines of the formulae $R^5$—$NH_2$ and $R^5R^6NH$, where $R^5$ is a $C_2$-$C_{20}$ alkenyl radical having from 1 to 3 C—C double bonds and $R^6$ is selected from $C_1$-$C_{10}$ alkyl, defined as above, and $R^5$. Preferred unsaturated amines are diallylamine and allylamine.

Hyperbranched polyesters of the invention containing ethylenically unsaturated groups generally have an average molecular weight $M_n$ of from 600 g/mol to 50000 g/mol, preferably from 950 g/mol to 20000 g/mol.

Hyperbranched polyesters of the invention containing ethylenically unsaturated groups generally have an average molecular weight $M_w$ of from 1000 g/mol to 100000 g/mol, preferably from 1100 g/mol to 50000 g/mol, determined by gel permeation chromatography.

Hyperbranched polyesters of the invention containing ethylenically unsaturated groups are normally obtained in the form of difficult-to-separate mixtures of different structural isomers, oligomers and polymers.

Hyperbranched polyesters of the invention containing ethylenically unsaturated groups carry on average at least one unsaturated group per molecule, preferably on average at least 2, and more preferably at least 3. The number of ethylenically unsaturated groups per molecule can be determined by conventional methods: for example, by determining the iodide number or by combining UV/vis spectroscopy and $^1$H NMR spectroscopy. For the purposes of the present invention even hyperbranched polyesters containing on average only one ethylenically unsaturated group are considered hyperbranched polyesters of the invention containing ethylenically unsaturated groups.

In one embodiment of the present invention the polydispersity of the hyperbranched polyesters of the invention containing ethylenically unsaturated groups is from 1.05 to 50, preferably from 1.1 to 40, more preferably up to 30, and very preferably up to 10.

Hyperbranched polyesters of the invention containing ethylenically unsaturated groups are usually of very good solubility, which is to say that they can be used to prepare clear solutions containing up to 50%, in certain cases even up to 80%, by weight of the polyesters of the invention containing ethylenically unsaturated groups in, for example, tetrahydrofuran (THF), n-butyl acetate, ethanol and numerous other solvents, without gel particles being detectable with the naked eye.

Hyperbranched polyesters of the invention containing ethylenically unsaturated groups are distinguished by particularly low levels of discoloration and resinification. As to the definition of hyperbranched polymers see also: P. J. Flory, J. Am. Chem. Soc. 1952, 74, 2718 and A. Sunder et al., Chem. Eur. J. 2000, 6, No. 1, 1-8.

The present invention further provides processes for preparing the hyperbranched polyesters of the invention containing ethylenically unsaturated groups.

In one variant, also referred to below as version A, the process of the invention comprises synthesizing at least one hyperbranched polyester by condensing
(a) at least one dicarboxylic acid or derivative thereof with at least one at least trifunctional alcohol
or
(b) at least one tricarboxylic or higher polycarboxylic acid or derivative thereof with at least one diol,
and then reacting the synthesis product with (c) at least one compound having at least one ethylenically unsaturated double bond.

In another variant, also referred to below as version B, the process of the invention comprises synthesizing at least one hyperbranched polyester of the invention containing ethylenically unsaturated groups by condensing
(a) at least one dicarboxylic acid or derivative thereof with at least one at least trifunctional alcohol,
or
(b) at least one tricarboxylic or higher polycarboxylic acid or derivative thereof with at least one diol,
in the presence of (c) at least one compound having at least one ethylenically unsaturated double bond.

Functional groups of compounds (c) having at least one ethylenically unsaturated double bond, which are able to react with functional groups of polyester, are defined below for simplicity as functional groups of compounds (c). Correspondingly, hydroxyl or carboxyl groups of hyperbranched polyester that are able to react with the respective functional groups of (c) are also referred to below for simplicity as functional groups of hyperbranched polyester.

The remarks below relate to both versions of the process of the invention, unless expressly indicated otherwise.

The classes of substance (a), (b), and (c) have been defined above.

For practicing the process of the invention according to version A a two-stage process is performed. For practicing the process of the invention according to version B a one-stage process is performed.

For practicing the process of the invention according to version A it is preferred to select a ratio of
a) at least one dicarboxylic acid or derivative thereof with at least one at least trifunctional alcohol
or
b) at least one tricarboxylic or higher polycarboxylic acid or derivative thereof with at least one diol such that the ratio of carboxyl groups and/or derivatized carboxyl groups to hydroxyl groups is from about 2:1 to 1:2, preferably from 3:2 to 2:3.

When performing the process of the invention according to version A the next step is to add an amount of compound having at least one ethylenically unsaturated double bond (c) such that the molar ratio of functional groups of hyperbranched polyester to functional groups of (c) is from 100:1 to 1:10, preferably from 20:1 to 1:2, more preferably up to 1:1.

For practicing the process of the invention according to version B it is preferred to select a ratio of
a) at least one dicarboxylic acid or derivative thereof with at least one at least trifunctional alcohol
or
b) at least one tricarboxylic or higher polycarboxylic acid or derivative thereof with at least one diol and c) at least one compound having at least one ethylenically unsaturated double bond such that the ratio of carboxyl groups and/or derivatized carboxyl groups in (a) or (b) to hydroxyl groups in (b) or (a) respectively is from 3:1 to 1:3. Additionally the amount of (c) is selected such that the molar ratio of functional groups of hyperbranched polyester formed in situ to functional groups of (c) is from 100:1 to 1:10, preferably from 20:1 to 1:1.

The process of the invention can be performed in the absence of acidic catalysts. It is preferred to operate in the presence of an acidic organic, inorganic or organometallic catalyst or mixtures of two or more acidic organic, inorganic or organometallic catalysts.

Examples of acidic inorganic catalysts for the purposes of the present invention include sulfuric acid, phosphoric acid, phosphonic acid, hypophosphorous acid, aluminum sulfate hydrate, alum, acidic silica gel (pH $\leq 6$, in particular $\leq 5$), and acidic alumina. Also possible for use as acidic inorganic catalysts are, for example, aluminum compounds of the formula $Al(OR^4)_3$ and titanates of the formula $Ti(OR^4)_4$, the radicals $R^4$ each being identical or different and selected independently of one another from $C_1$-$C_{10}$ alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl or n-decyl, $C_3$-$C_{12}$ cycloalkyl radicals, such as cyclopropyl, cyclobutyl, cyclopentyl, cyclohexyl, cycloheptyl, cyclooctyl, cyclononyl, cyclodecyl, cycloundecyl and cyclododecyl; preferably cyclopentyl, cyclohexyl or cycloheptyl.

Preferably the radicals $R^4$ in $Al(OR^4)_3$ and $Ti(OR^4)_4$ are each identical and selected from isopropyl and 2-ethylhexyl.

Preferred acidic organometallic catalysts are selected, for example, from dialkyl tin oxides $(R^4)_2SnO$, where $R^4$ is as defined above. One particularly preferred representative of acidic organometallic catalysts is di-n-butyltin oxide, available commercially in the form of oxo-tin. Preference is also given to di-n-butyltin dilaurate, dibutyltin diacetate and di-n-butyltin di-n-butyrate.

Preferred acidic organic catalysts are acidic organic compounds containing, for example, phosphate, sulfonic acid, sulfate or phosphonic acid groups. Particular preference is given to sulfonic acids, such as para-toluenesulfonic acid, for example. Acidic ion exchangers can be used as acidic organic catalysts, examples being sulfo-containing polystyrene resins crosslinked with about 2 mol % of divinylbenzene.

Combinations of two or more of the aforementioned catalysts can be used. Another possibility is to use those organic or organometallic or inorganic catalysts that are present in the form of discrete molecules in an immobilized form.

If it is desired to use acidic organic, inorganic or organometallic catalysts the amount of catalyst used in accordance with the invention is from 0.1 to 10% by weight, preferably from 0.2 to 2% by weight.

Enzymes or enzyme decomposition products are not included among acidic organic catalysts for the purposes of the present invention. Similarly the dicarboxylic acids reacted in accordance with the invention are not included among acidic organic catalysts for the purposes of the present invention.

In another embodiment the process of the invention is conducted in the presence of at least one enzyme. The use of lipases and esterases is preferred. Highly suitable lipases and esterases include *Candida cylindracea*, *Candida lipolytica*, *Candida rugosa*, *Candida antarctica*, *Candida utilis*, *Chromobacterium viscosum*, *Geotrichum viscosum*, *Geotrichum candidum*, *Mucor javanicus*, *Mucor miehei*, pig pancreas, *Pseudomonas* spp., *Pseudomonas fluorescens*, *Pseudomonas cepacia*, *Rhizopus arrhizus*, *Rhizopus delemar*, *Rhizopus niveus*, *Rhizopus oryzae*, *Aspergillus niger*, *Penicillium roquefortii*, *Penicillium camembertii* or esterase from *Bacillus* spp. and *Bacillus thermoglucosidasius*. Particular preference is given to *Candida antarctica* Lipase B. The enzymes listed are available commercially, from Novozymes Biotech Inc., Denmark, for example.

It is preferred to use enzyme in immobilized form, on silica gel or Lewatit®, for example. Methods of immobilizing enzymes are known per se, from for example Kurt Faber, "Biotransformations in Organic Chemistry", 3rd edition 1997, Springer Verlag, Section 3.2 "Immobilization" pages 345-356. Immobilized enzymes are available commercially, from Novozymes Biotech Inc., Denmark, for example.

The amount of enzyme used is from 1 to 20% by weight, in particular 10-15% by weight, based on the mass of the total starting materials for reaction that are used.

In one embodiment of the present invention the process of the invention can be conducted under an inert gas atmosphere, which means, for example, under carbon dioxide, nitrogen or a noble gas, more particularly argon.

If it is desired to conduct the process of the invention in the absence of enzyme then it is preferred to operate at temperatures from 80 to 200° C. It is preferred to operate at temperatures of from 130 to 180° C., in particular up to 150° C. or below. Particular preference is given to maximum temperatures of up to 145° C., more preferably up to 135° C.

If it is desired to conduct the process of the invention in the presence of enzyme then it is preferred to operate at temperatures above 40° C., more preferably above 60° C. It is preferred to operate at temperatures of 100° C. or below. Preference is given to temperatures up to 80° C., more preferably from 62 to 75° C., and more preferably still from 65 to 75° C.

The pressure conditions of the process of the invention are not critical per se. It is possible to operate at a considerably reduced pressure, at from 10 to 500 mbar, for example. The process of the invention can also be conducted at pressures above 500 mbar. For reasons of simplicity it is preferred to carry out the reaction at atmospheric pressure, although it can also be carried out at a slightly elevated pressure, up to 1200 mbar, for example. Working under a significantly increased pressure is a further possibility, at pressures up to 10 bar, for example. Reaction at atmospheric pressure is preferred.

The reaction time in the process of the invention is usually from 10 minutes to 25 hours, preferably from 30 minutes to 10 hours, and more preferably from 1 to 8 hours.

After the end of reaction the desired products can easily be isolated, by for example removing the catalyst by filtration and concentrating the filtrate, usually under reduced pressure. Further highly suitable workup methods include precipitation following the addition of water and subsequent washing and drying. Dialysis methods can also be used for further purification. Particularly suitable dialysis methods are those using benzoylated cellulose membranes. Dialysis methods are especially suitable for separating off unreacted low molecular reactants of low volatility, such as fatty acids, for example.

If it is desired to conduct the process of the invention according to version A then there is no need to isolate hyperbranched polyester and instead operation can be continued immediately by adding (c) at least one compound containing at least one ethylenic double bond.

If it is desired to conduct the process of the invention according to version A then two different catalysts can be employed in the two stages. For example, first hyperbranched polyester can be prepared by enzyme catalysis and then (c) at least one compound having at least one ethylenic double bond can be condensed on by catalysis with, for example $(R^4)_2$SnO. It is likewise possible, for example, to prepare hyperbranched polyester by catalysis with, say, $(R^4)_2$SnO and then to condense on c) at least one compound having at least one ethylenic double bond by means of enzyme catalysis.

If it is desired to conduct the process of the invention according to version B then it is preferred to operate in the presence of free-radical scavengers (inhibitors). Examples of suitable inhibitors include hydroquinone, hydroquinone monomethyl ether, phenothiazine, phenol derivatives such as 2-tert-butyl-4-methylphenol and 6-tert-butyl-2,4-dimethylphenol, for example, and N-oxyl compounds such as, for example, 4-hydroxy-2,2,6,6-tetramethylpiperidine-N-oxyl (TEMPOL), 4-oxo-2,2,6,6-tetramethylpiperidine-N-oxyl, and 2,2,6,6-tetramethylpiperidine-N-oxy (TEMPO). Customary inhibitor amounts are in the range from 50 to 2000 ppm, based in each case on the total amount of the compound having at least one ethylenic double bond that is used.

If it is desired to conduct the process of the invention according to version A then it is preferred, following the addition of (c) at least one compound having at least one ethylenic double bond, to operate in the presence of free-radical scavengers (inhibitors), suitable inhibitors having been described above. As will be appreciated it is also possible to add inhibitor before adding (c) at least one compound having at least one ethylenic double bond.

The process of the invention can be conducted by operating in the presence of a water remover additive, added at the beginning of the reaction. Suitable examples include molecular sieves, especially 4 Å molecular sieve, $MgSO_4$ and $Na_2SO_4$. Further water remover additive can also be added during the reaction or replaced by fresh water remover additive during the reaction. Water or alcohol formed during the reaction can be distilled off and, for example, a water separator can be used.

The process of the invention can be conducted in the presence of solvent. Examples of suitable solvents include hydrocarbons such as paraffins or aromatics. Particularly suitable paraffins are n-heptane and cyclohexane. Particularly suitable aromatics are toluene, ortho-xylene, meta-xylene, para-xylene, xylene isomer mixture, ethylbenzene, chlorobenzene, and ortho- and meta-dichlorobenzene. Furthermore, especially suitable solvents in the absence of acidic catalysts include the following: ethers such as dioxane or tetrahydrofuran, for example, and ketones such as methyl ethyl ketone and methyl isobutyl ketone, for example.

The amount of solvent added is in accordance with the invention at least 0.1% by weight, based on the mass of the starting materials for reaction that are used; preference is given to using at least 1% by weight, and particular preference to at least 10% by weight. Excesses of solvent, based on the mass of starting materials for reaction that are used, can also be employed, examples being from 1.01 to 10 times. Solvent amounts of more than 100 times, based on the mass of starting materials for reaction that are used, are not advantageous, since at significantly lower concentrations of the reactants the reaction rate falls away significantly, leading to uneconomically long reaction times.

It is also possible, however, to operate without using solvent.

The process of the invention can be conducted in the presence of at least one saturated monocarboxylic acid or derivative thereof or at least one saturated monoalcohol, and the molecular weight of the resultant products can be influenced by this means. Examples of suitable representatives include acetic acid, propionic acid, butyric acid, isobutyric acid, valeric acid, pivalic acid, capronic acid, caprylic acid, n-heptanoic acid, n-octanoic acid, n-nonanoic acid, n-decanoic acid, n-dodecanoic acid, n-tetradecanoic acid, palmitic acid, stearic acid, isostearic acid, isononanoic acid and 2-ethylhexanoic acid.

Suitable representatives of alcohols are ethylene glycol monomethyl ether, ethylene glycol mono-n-butyl ether, benzyl alcohol, 1-dodecanol, 1-tetradecanol, 1-hexadecanol, and 1-octadecanol.

The present invention further provides for the use of the hyperbranched polyesters of the invention containing ethylenically unsaturated groups as binders, in coatings for example, and particularly in clearcoat materials.

The present invention further provides a process for preparing radiation-curable compositions using polyesters of the invention containing ethylenically unsaturated groups. Also provided are radiation-curable compositions comprising polyesters of the invention containing unsaturated groups.

Radiation-curable compositions of the invention may include, in addition to at least one polyester of the invention containing ethylenically unsaturated groups, reactive diluents, photoinitiators, and other typical coatings additives.

Suitable reactive diluents can be, for example, radiation-curable, free-radically polymerizable reactive diluents, such as the triacrylic esters of trimethylolpropane, tetraacrylic esters of pentaerythritol and ethoxylated and/or propoxylated derivatives thereof, diacrylic esters of dipropylene glycol, tripropylene glycol, diethylene glycol, 1,2-ethanediol, 1,3- or 1,4-butanediol or 1,6-hexanediol.

Mention may also be made, for example, of $C_1$-$C_{20}$ alkyl (meth)acrylates and also of vinyl aromatics having up to 20 carbon atoms.

Preferred alkyl (meth)acrylates are those having a $C_1$-$C_{10}$ alkyl radical, such as methyl methacrylate, methyl acrylate, n-butyl acrylate, ethyl acrylate and 2-ethylhexyl acrylate.

Mixtures of the abovementioned alkyl (meth)acrylates in particular are also suitable.

Examples of suitable vinyl aromatic compounds include vinyl toluene, α-butylstyrene, 4-n-butylstyrene, 4-n-decylstyrene, and, preferably, styrene.

Radiation-curable compositions of the invention contain preferably photoinitiator in fractions of from 0.1 to 5% by weight, based on the respective coating material.

As photoinitiators it is possible to use photoinitiators known to the skiller worker, examples being those specified in "Advances in Polymer Science", Volume 14, Springer Berlin 1974 or in K. K. Dietliker, Chemistry and Technology of UV and EB Formulation for Coatings, Inks and Paints, Volume 3: Photoinitiators for Free Radical and Cationic Polymerisation, P. K. T. Oldring (Ed), SITA Technology Ltd, London.

Suitable examples include mono- or bisacylphosphine oxides such as Irgacure 819 (bis(2,4,6-trimethylbenzoyl)phenylphosphine oxide), as described in for example EP-A 0 007 508, EP-A 0 057 474, DE-A 196 18 720, EP-A 0 495 751 or EP-A 0 615 980, such as 2,4,6-trimethylbenzoyldiphenylphosphine oxide, ethyl 2,4,6-trimethylbenzoylphenylphosphinate, benzophenones, hydroxyacetophenones, phenylglyoxylic acid and its derivatives, or mixtures of the aforementioned photoinitiators. Preferred examples that may be mentioned include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, para-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-di-iso-propylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7-H-benzoin methyl ether, benz[de]anthracen-7-one, 1-naphthaldehyde, 4,4'-bis(dimethylamino) benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tris-o-tolylphosphine, benz[a]anthracene-7,12-dione, 2,2-diethoxyacetophenone, benzyl ketals, such as benzyl dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, and 2-amylanthraquinone, and 2,3-butanedione.

Also suitable are non yellowing or low-yellowing photoinitiators of the phenylglyoxalic ester type, as described in DE-A 198 26 712, DE-A 199 13 353 or WO 98/33761.

Of the photoinitiators mentioned particular preference is given to phosphine oxides, α-hydroxy ketones and benzophenones.

In particular it is also possible to use mixtures of different photoinitiators.

Photoinitiators can be used alone or in combination with a photopolymerization promoter, of the benzoic acid, amine or similar type, for example.

As further typical coatings additives use may be made of, for example, antioxidants, oxidation inhibitors, stabilizers, activators (accelerants), fillers, pigments, dyes, devolatilizers, luster agents, antistats, flame retardants, thickeners, thixotropic agents, leveling assistants, binders, antifoams, fragrances, surfactants, viscosity modifiers, plasticizers, tackifying resins (tackifiers), chelating agents or compatibilizers.

In addition it is possible to add one or more light- and/or heat-activable initiators, examples being potassium peroxodisulfate, dibenzoyl peroxide, cyclohexanone peroxide, di-tert-butyl peroxide, azobisisobutyronitrile, cyclohexylsulfonyl acetyl peroxide, diisopropyl percarbonate, tert-butyl peroctoate or benzpinacol, and also, for example, those heat-activable initiators which have a half-life at 80° C. of more than 100 hours, such as di-t-butyl peroxide, cumene hydroperoxide, dicumyl peroxide, t-butyl perbenzoate, silylated pinacols, available commercially, for example, under the trade name ADDID 600 from Wacker, or hydroxyl-containing amine N-oxides, such as 2,2,6,6-tetramethylpiperidine-N-oxyl and 4-hydroxy-2,2,6,6-tetramethylpiperidine-N-oxyl.

Further examples of suitable initiators are described in "Polymer Handbook", 2nd ed., Wiley & Sons, New York.

Besides free-radical addition (co)polymers, suitable thickeners include customary organic and inorganic thickeners such as hydroxymethylcellulose or bentonite.

Chelating agents which can be used include, for example, ethylenediamineacetic acid and its salts and also β-diketones.

Suitable fillers include silicates, examples being silicates obtainable by hydrolysis of silicon tetrachloride, such as Aerosil® from Degussa, and also silicon earth, talc, aluminum silicates, magnesium silicates, and calcium carbonates.

Suitable stabilizers include typical UV absorbers such as oxanilides, triazines and benzotriazole (the latter available as Tinuvin® grades from Ciba-Spezialitätenchemie), and benzophenones. These stabilizers can be used alone or together with suitable free-radical scavengers, examples being sterically hindered amines such as 2,2,6,6-tetramethylpiperidine, 2,6-di-tert-butylpiperidine or derivatives thereof, e.g., bis-(2, 2,6,6-tetramethyl-4-piperidyl) sebacinate. Stabilizers are normally used in amounts of from 0.1 to 5.0% by weight, based on the solid components present in the formulation.

Examples of suitable stabilizers additionally include N-oxyls, such as 4-hydroxy-2,2,6,6-tetramethylpiperidine-N-oxyl, 4-oxo-2,2,6,6-tetramethylpiperidine-N-oxyl, 4-acetoxy-2,2,6,6-tetramethylpiperidine-N-oxyl, 2,2,6,6-tetramethylpiperidine-N-oxyl, 4,4',4"-tris(2,2,6,6-tetramethylpiperidine-N-oxyl) phosphite or 3-oxo-2,2,5,5-tetramethylpyrrolidine-N-oxyl, phenols and naphthols, such as p-aminophenol, p-nitrosophenol, 2-tert-butylphenol, 4-tert-butylphenol, 2,4-di-tert-butylphenol, 2-methyl-4-tert-butylphenol, 4-methyl-2,6-tert-butylphenol (2,6-tert-butyl-p-cresol) or 4-tert-butyl-2,6-dimethylphenol, quinones, such as hydroquinone or hydroquinone monomethyl ether, aromatic amines, such as N,N-diphenylamine, N-nitrosodiphenylamine, phenylenediamines, such as N,N'-dialkyl-para-phenylenediamine, in which the alkyl radicals may be identical or different and may each independently consist of from 1 to 4 carbon atoms and be straight-chain or branched, hydroxylamines, such as N,N-diethylhydroxylamine, urea derivatives, such as urea or thiourea, phosphorus compounds such as triphenylphosphine, triphenyl phosphite or triethyl phosphite, or sulfur compounds, such as diphenyl sulfide or phenothiazine.

Radiation-curable compositions of the invention are typically composed for example of 40-100% by weight of one or more polyesters of the invention containing ethylenically unsaturated groups, preferably 50-90%, more preferably 60-90%, and in particular 60-80%, by weight, 0-60% by weight of reactive diluents, preferably 5-50%, more preferably 6-40%, and in particular 10-30%, by weight, 0-20% by weight of photoinitiators, preferably 0.5-15%, more preferably 1-10%, and in particular 2-5%, by weight, and 0-50% by weight of typical coatings additives, preferably 2-40%, more preferably 3-30%, and in particular 5-20%, by weight, with the proviso that the constituents together make 100% by weight.

Polyesters of the invention containing ethylenically unsaturated groups are particularly suitable for use as or in compositions which can be cured by means of high-energy radiation, also referred to in the context of the present invention as radiation-curable compositions of the invention.

The present invention additionally provides a method of coating substrates, which comprises using techniques known per se to the skilled worker to coat substrates, examples being metal, wood, glass, plastic (e.g. polycarbonate), textile, leather, paper or cardboard, with radiation-curable compositions of the invention comprising hyperbranched polyesters of the invention containing ethylenically unsaturated groups, and then subjecting the applied coating to actinic radiation. Suitable actinic radiation includes for example electromagnetic rays with a wavelength range of from 100 to 450 nm. Substrates coated with radiation-curable compositions of the invention—with paint, for example—can be subjected to actinic radiation having an energy in the range from 80 to 3000 mJ/cm². Actinic radiation can be deployed, for example, in continuous form or in the form of flashes. Examples of suitable radiation sources include low-pressure, medium-pressure or high-pressure mercury lamps.

Curing by means of electron beams, in particular by means of secondary electrons in an energy range between 0 and 50 eV, is likewise possible.

Combinations of two or more radiation sources can also be employed.

The invention is illustrated by means of working examples.

General initial remarks:

The acid number was determined in accordance with DIN 53402. $M_n$ and $M_w$ were determined by gel permeation chromatography (GPC) in THF (with polymethyl methacrylate calibration). The OH number was determined in accordance with DIN 53240. The incorporation of unsaturated compound having at least one ethylenic double bond was determined by means of $^1$H-NMR spectroscopy.

The reactions were conducted under nitrogen unless indicated otherwise. Solvents were dried by usual laboratory methods; THF and 1,4-dioxane, for example, by distillation over Na/benzophenone.

The immobilized lipase CA used in some of the examples, available commercially as Novozym® 435, was characterized as follows: 10000 PLU/g (propyl laurate units), 1 to 10% by weight of enzyme/g of Novozym® 435.

Version A

EXAMPLE A1.1

1645 g (11.3 mol) of adipic acid and 864 g (9.4 mol) of glycerol were charged to a 5 l glass flask equipped with stirrer, internal thermometer, gas inlet tube, reflux condenser, and vacuum attachment with cold trap. 3.6 g of di-n-butyltin oxide, available commercially as Fascat® 4201, were added and the mixture was heated using an oil bath to an internal temperature of 140° C. A reduced pressure of 150 mbar was applied in order to separate off water formed during the reaction. The reaction mixture was held at the stated temperature and pressure for 3 hours, after which the pressure was lowered to 50 mbar and the batch held at 140° C. for a further 7 hours. Thereafter it was cooled to room temperature.

This gave 2147 g of hyperbranched polyester A1.1 as a clear, viscous liquid. The analytical data are compiled in table 1.

EXAMPLE A1.2

460 g (3.2 mol) of adipic acid and 240 g (2.6 mol) of glycerol were charged to a 1 l glass flask equipped with stirrer, internal thermometer, gas inlet tube, reflux condenser, and vacuum attachment with cold trap. 1 g of di-n-butyltin oxide, available commercially as Fascat® 4201, were added and the mixture was heated using an oil bath to an internal temperature of 150° C. A reduced pressure of 120 mbar was applied in order to separate off water formed during the reaction. The reaction mixture was held at the stated temperature and pressure for 3 hours, after which the pressure was lowered to 50 mbar and the batch held at 150° C. for a further 3 hours. Thereafter it was cooled to room temperature.

This gave 582 g of hyperbranched polyester A1.2 as a clear, viscous liquid. The analytical data are compiled in table 1.

EXAMPLE A1.3

1645 g (11.3 mol) of adipic acid and 868 g (9.4 mol) of glycerol were charged to a 5 l glass flask equipped with stirrer, internal thermometer, gas inlet tube, reflux condenser, and vacuum attachment with cold trap 2.5 g of di-n-butyltin oxide, available commercially as Fascat® 4201, were added and the mixture was heated using an oil bath to an internal temperature of 135° C. A reduced pressure of 100 mbar was applied in order to separate off water formed during the reaction. The reaction mixture was held at the stated temperature and pressure for 9 hours.

Subsequently 383 g (4.1 mol) of glycerol were added, the pressure was lowered initially to 50 mbar and then to 20 mbar, and the batch was maintained at 135° C. for 10 hours more. It was then cooled to room temperature.

This gave 2409 g of hyperbranched polyester A1.3 as a clear, viscous liquid. The analytical data are compiled in table 1.

EXAMPLE A2.1

521 g of the hyperbranched polyester A1.1 were charged to a 5 l glass flask equipped with stirrer, gas inlet tube, reflux condenser, and water separator, the water separator being connected to a vacuum pump.

1.5 l of tetrahydrofuran (THF), 52 g (183 mmol) of a reaction product of the formula

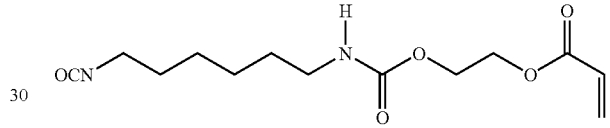

(reaction product of 2-hydroxyethyl acrylate and hexamethylene diisocyanate as per EP-A 1 110 946) and 0.055 g of 4-hydroxy-2,2,6,6-tetramethylpiperidine-N-oxyl were added. The reaction mixture was held for 2 hours at a temperature of 60° C. with stirring. Thereafter the tetrahydrofuran was distilled off under reduced pressure.

This gave 539 g of hyperbranched polyester of the invention containing unsaturated groups, A2.1, as a clear, viscous liquid. The analytical data are compiled in table 1.

EXAMPLE A2.2

100 g of the hyperbranched polyester A1.2 were charged to a 250 ml glass flask equipped with stirrer, gas inlet tube, reflux condenser and water separator, the water separator being connected to a vacuum pump. 12 ml (12.13 g, 105 mmol) of 2-hydroxyethyl acrylate, 26 g of immobilized lipase CA, available commercially as Novozym® 435, 0.33 g of 4-hydroxy-2,2,6,6-tetramethylpiperidine-N-oxyl and 90 ml of 1,4-dioxane were added. The reaction mixture was held for 9.5 hours at a temperature of 65° C. with stirring.

The immobilized enzyme was then separated off by filtration, and 1,4-dioxane and water formed during the reaction were separated off under reduced pressure.

This gave 103 g of hyperbranched polyester of the invention containing unsaturated groups, A2.2, as a clear, viscous liquid. The analytical data are compiled in table 1.

EXAMPLE A3.2

100 g of the hyperbranched polyester A1.2 were charged to a 250 ml glass flask equipped with stirrer, gas inlet tube, reflux condenser and water separator, the water separator being connected to a vacuum pump. 13 ml (13.6 g, 104 mmol) of 3-hydroxypropyl acrylate, 26 g of immobilized lipase CA, available commercially as Novozym® 435, 0.33 g of 4-hydroxy-2,2,6,6-tetramethylpiperidine-N-oxyl and 90 ml of 1,4-dioxane were added. A pressure of 400 mbar was set and the reaction mixture was held for 8 hours at a temperature of 65° C. with stirring.

The immobilized enzyme was then separated off by filtration, and 1,4-dioxane and water formed during the reaction were separated off under reduced pressure.

This gave 102 g of hyperbranched polyester of the invention containing unsaturated groups, A3.2, as a clear, viscous liquid. The analytical data are compiled in table 1.

EXAMPLE A2.3

100 g of the hyperbranched polyester A1.3 were charged to a 250 ml glass flask equipped with stirrer, gas inlet tube, reflux condenser and water separator, the water separator being connected to a vacuum pump. 10 g (69 mmol) of 4-hydroxybutyl acrylate, 7 g of immobilized lipase CA, available commercially as Novozym® 435, 0.1 g of 4-hydroxy-2,2,6,6-tetramethylpiperidine-N-oxyl and 50 ml of toluene were added. A pressure of 350-400 mbar was set and the reaction mixture was held for 8 hours at a temperature of 60° C. with stirring.

The immobilized enzyme was then separated off by filtration, and toluene and water formed during the reaction were separated off under reduced pressure.

This gave 105 g of hyperbranched polyester of the invention containing unsaturated groups, A2.3, as a clear, viscous liquid. The analytical data are compiled in table 1.

EXAMPLE A2.4

300 g of the hyperbranched polyester A1.1 were charged to a 2 l glass flask equipped with stirrer, gas inlet tube, reflux condenser and water separator, the water separator being connected to a vacuum pump. 300 g of methyl acrylate, 15 g of immobilized lipase CA, available commercially as Novozym® 435, 0.18 g of 4-hydroxy-2,2,6,6-tetramethylpiperidine-N-oxyl and 500 ml of toluene were added. The reaction mixture was held for 8 hours at a temperature of 70° C. and at 400 mbar with stirring.

The immobilized enzyme was then separated off by filtration, and toluene and methanol formed during the reaction were separated off under reduced pressure.

This gave 331 g of hyperbranched polyester of the invention containing unsaturated groups, A2.4, as a clear, viscous liquid. The analytical data are compiled in table 1.

Version B

EXAMPLE B1

92 g (0.63 mol) of adipic acid, 48 g (0.53 mol) of glycerol and 76 g (0.53 mol) of 4-hydroxybutyl acrylate were charged to a 250 ml glass flask equipped with stirrer, internal thermometer, gas inlet tube, reflux condenser, and vacuum attachment with cold trap. 0.044 g of 4-hydroxy-2,2,6,6-tetramethylpiperidine-N-oxyl and 0.15 g of di-n-butyltin oxide, available commercially as Fascat® 4201, were added and the mixture was heated using an oil bath to an internal temperature of 120° C. A pressure of 150 mbar was applied in order to separate off water formed during the reaction. The reaction mixture was held at 120° C. and the stated pressure for 90 minutes and at 120° C. and 15 mbar for a further 6½ hours, and then was cooled to room temperature.

This gave 111 g of hyperbranched polyester of the invention containing unsaturated groups, B1, as a clear, viscous liquid. The analytical data are compiled in table 2.

EXAMPLE B2

44 g (0.3 mol) of adipic acid, 23 g (0.25 mol) of glycerol and 6.7 g (47 mmol) of 4-hydroxybutyl acrylate were charged to a 250 ml glass flask equipped with stirrer, internal thermometer, gas inlet tube, reflux condenser, and vacuum attachment with cold trap. 0.06 g of 4-hydroxy-2,2,6,6-tetramethylpiperidine-N-oxyl, 50 ml of toluene and 7 g of immobilized lipase CA, available commercially as Novozym® 435, were added and the mixture was heated using an oil bath to an internal temperature of 60° C. The reaction mixture was held at 60° C. and 200 mbar for 21 hours, and then was cooled to room temperature.

Subsequently the immobilized enzyme was separated off by filtration, and toluene and water formed during the reaction were separated off under reduced pressure.

This gave 58 g of hyperbranched polyester of the invention containing unsaturated groups, B2, as a clear, viscous liquid. The analytical data are compiled in table 2.

EXAMPLE B3

60 g (0.41 mol) of adipic acid, 82 g (0.34 mol) of triglycerol and 4.9 g (34 mmol) of 4-hydroxybutyl acrylate were charged to a 250 ml glass flask equipped with stirrer, internal thermometer, gas inlet tube, reflux condenser, and vacuum attachment with cold trap. 0.05 g of 4-hydroxy-2,2,6,6-tetrameth-

TABLE 1

Analytical data of hyperbranched polyesters and of hyperbranched polyesters of the invention containing unsaturated groups, prepared according to version A

| Product No. | Hyperbranched polyester as starting material | $M_n$ [g/mol] | $M_w$ [g/mol] | Acid No. | OH— No. | Incorporation [mmol/g] |
|---|---|---|---|---|---|---|
| A1.1 | — | 1640 | 3270 | 106 | 243 | 0 |
| A1.2 | — | 1230 | 1490 | 92 | n.d. | 0 |
| A1.3 | — | 1900 | 6910 | 31 | 416 | 0 |
| A2.1 | A1.1 | 2160 | 7140 | 75 | 181 | 0.24 |
| A2.2 | A1.2 | 1375 | 2080 | 43 | 144 | 0.44 |
| A3.2 | A1.2 | 1280 | 1770 | 63 | 185 | 0.35 |
| A2.3 | A1.3 | 3450 | 8500 | 21 | 389 | 0.5 |
| A2.4 | A1.1 | 2440 | 16780 | 47 | 155 | 0.82 |

Incorporation: defined as mmol of compound having ethylenically unsaturated double bond/g of hyperbranched polyester used as starting material.

ylpiperidine-N-oxyl and 0.15 g of di-n-butyltin oxide, available commercially as Fascat® 4201, were added and the mixture was heated using an oil bath to an internal temperature of 120° C. A reduced pressure of 150 mbar was applied in order to separate off water formed during the reaction. The reaction mixture was held at 120° C. and the stated pressure for 90 minutes and at 120° C. and 15 mbar for a further 6½ hours, and then was cooled to room temperature.

This gave 120 g of hyperbranched polyester of the invention containing unsaturated groups, B3, as a clear, viscous liquid. The analytical data are compiled in table 2.

EXAMPLE B4

88 g (0.60 mol) of adipic acid, 37.7 g (0.28 mol) of trimethylolpropane, 36.2 g (0.25 mol) of 1,4-bis(hydroxymethyl)cyclohexane in the form of the cis/transisomer mixture, and 8.8 g (61 mmol) of 4-hydroxybutyl acrylate were charged to a 250 ml glass flask equipped with stirrer, internal thermometer, gas inlet tube, reflux condenser, and vacuum attachment with cold trap. 0.05 g of 4-hydroxy-2,2,6,6-tetramethylpiperidine-N-oxyl and 0.17 g of di-n-butyltin oxide, available commercially as Fascat® 4201, were added and the mixture was heated using an oil bath to an internal temperature of 120° C. A reduced pressure of 120 mbar was applied in order to separate off water formed during the reaction. The reaction mixture was held at 120° C. and the stated pressure for 7 hours and at 120° C. and 15 mbar for a further 1 hour, and then was cooled to room temperature.

This gave 131 g of hyperbranched polyester of the invention containing unsaturated groups, B4, as a clear, viscous liquid. The analytical data are compiled in table 2.

EXAMPLE B5

88 g (0.60 mol) of adipic acid, 46 g (0.5 mol) of glycerol and 7 g (70 mmol) of methyl methacrylate were charged to a 250 ml glass flask equipped with stirrer, internal thermometer, gas inlet tube, reflux condenser, and vacuum attachment with cold trap. 0.1 g of 4-hydroxy-2,2,6,6-tetramethylpiperidine-N-oxyl, 75 ml of toluene and 7 g of immobilized lipase CA, available commercially as Novozym® 435, were added; a pressure of 250 mbar was established, and the mixture was heated using an oil bath to an internal temperature of 60° C. The reaction mixture was held at 60° C. and the stated pressure for 2 hours and at 60° C. and 15 mbar for a further 6 hours, and then was cooled to room temperature.

Subsequently the immobilized enzyme was separated off by filtration, and toluene and also water formed during the reaction and methanol were separated off under reduced pressure.

This gave 117 g of hyperbranched polyester of the invention containing unsaturated groups, B5, as a clear, viscous liquid. The analytical data are compiled in table 2.

EXAMPLE B6

88 g (0.60 mol) of adipic acid, 168.2 g (0.25 mol) of ethoxylated trimethylolpropane of the formula $CH_3CH_2C[CH_2(OCH_2CH_2)_5OH]_3$, 36.2 g (0.25 mol) of 1,4-bis(hydroxymethyl)cyclohexane in the form of the cis/transisomer mixture and 8.8 g (61 mmol) of 4-hydroxybutyl acrylate were charged to a 250 ml glass flask equipped with stirrer, internal thermometer, gas inlet tube, reflux condenser, and vacuum attachment with cold trap. 0.1 g of 4-hydroxy-2,2,6,6-tetramethylpiperidine-N-oxyl, 75 ml of toluene and 7 g of immobilized lipase CA, available commercially as Novozym® 435, were added and the mixture was heated using an oil bath to an internal temperature of 60° C. The reaction mixture was held at 60° C. and 200 mbar for 8 hours, and then was cooled to room temperature.

Subsequently the immobilized enzyme was separated off by filtration, and toluene and also water formed during the reaction and methanol were separated off under reduced pressure.

This gave 241 g of hyperbranched polyester of the invention containing unsaturated groups, B6, as a clear, viscous liquid. The analytical data are compiled in table 2.

TABLE 2

Analytical data of hyperbranched polyesters of the invention containing unsaturated groups, prepared according to version B

| Product | $M_n$ [g/mol] | $M_w$ [g/mol] | Acid No. | OH No. | Incorporation |
|---|---|---|---|---|---|
| B1 | 975 | 1100 | 213 | 347 | 0.27 |
| B2 | 1660 | 3360 | 19 | n.d. | 0.76 |
| B3 | 680 | 1500 | 156 | 513 | 0.34 |
| B4 | 1250 | 1630 | 120 | 179 | 0.33 |
| B5 | 2100 | 3630 | 67 | 215 | 0.20 |
| B6 | 1780 | 2770 | 45 | 72 | 0.22 |

Incorporation: defined as mmol of compound having ethylenically unsaturated double bond/g of hyperbranched polyester used as starting material.

3. Performance Testing

Hyperbranched polyester A2.4 of the invention, containing unsaturated groups, as per table 1 was mixed as per table 3 with the stated amount of the photoinitiator mixture composed of 50 percent by weight of 1-hydroxycyclohexyl phenyl ketone and 50 percent by weight of benzophenone (available commercially as Irgacure®500 from Ciba Spezialitätenchemie, called "I 500" in table 3) and the mixture was applied to the respective substrate (glass, metal) and exposed under an undoped high-pressure mercury lamp (output: 120 W/cm) with a lamp-to-substrate distance of 12 cm and at a belt speed of 10 m/min, to give tack-free coatings.

The pendulum hardness (PD) was determined in accordance with DIN 53157 and is a measure of the hardness of the coating. The result is reported in the number of swings until the pendulum reaches standstill (Sg). High values denote high hardness. The films for the determination of the pendulum hardness were applied to glass by means of a boxy-type coating bar. The film thickness after exposure was approximately 70 μm.

The Erichsen cupping (ET) was determined in accordance with DIN 53156 and is a measure of the flexibility and elasticity of a coating. The result is reported in millimeters (mm). High values denote high flexibility. The films for the determination of the Erichsen cupping were applied to sheet metal using a spiral-wound coating bar. The film thickness following exposure was approximately 40 μm.

TABLE 3

Results of the performance testing of hyperbranched polyesters of the invention containing unsaturated groups A2.4

| | I 500 (% by weight) | PD (swings) | ET (mm) |
|---|---|---|---|
| Example 3.1 | 0 | Not measurable | Not measurable |
| Example 3.2 | 1 | 21 | 5.4 |
| Example 3.3 | 2 | 22 | 5.5 |

TABLE 3-continued

Results of the performance testing of
hyperbranched polyesters of the invention
containing unsaturated groups A2.4

|  | I 500 (% by weight) | PD (swings) | ET (mm) |
| --- | --- | --- | --- |
| Example 3.4 | 3 | 22 | 5.5 |
| Example 3.5 | 4 | 22 | 5.5 |

Curing by exposure to UV radiation was effective when A2.4 photoinitiator was mixed in. With use of the photoinitiator the films had near-identical properties, independent of its concentration. It is therefore possible to produce coatings using very small amounts of photoinitiator.

We claim:

1. A hyperbranched polyester comprising ethylenically unsaturated groups, obtained by a method, comprising:
(c) reacting at least one compound having at least one ethylenic double bond with at least one hyperbranched polyester to obtain the hyperbranched polyester comprising ethylenically unsaturated groups, wherein
the at least one compound having at least one ethylenic double bond is bonded to the hyperbranched polyester, and
the hyperbranched polyester is obtained by condensing;
(a) at least one dicarboxylic acid or derivative thereof with at least one at least trifunctional alcohol; or
(b) at least one tricarboxylic or higher polycarboxylic acid or derivative thereof with at least one diol,
wherein
a molar ratio of hydroxyl groups of the at least one at least trifunctional alcohol or at least one diol to carboxyl groups of the at least one dicarboxylic acid or at least one tricarboxylic or higher polycarboxylic acid, respectively, is from 1.5/1 to 1/1.5.

2. The hyperbranched polyester comprising unsaturated groups as claimed in claim 1, wherein the at least one compound having at least one ethylenic double bond is a compound having a terminal double bond.

3. The hyperbranched polyester comprising unsaturated groups as claimed in claim 1, wherein the at least one compound having at least one ethylenic double bond is a compound of the formula Ia or Ib

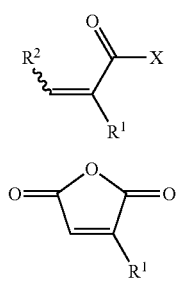

wherein:
$R^1$ is selected from the group consisting of $C_1$-$C_{10}$ alkyl, unbranched or branched, and hydrogen;
$R^2$ is selected from the group consisting of $C_1$-$C_{10}$ alkyl, unbranched or branched, $C_2$-$C_6$ alkenyl, COOH, and hydrogen;
X is selected from halogen and $OR^3$; and $R^3$ is selected from the group consisting of $C_1$-$C_{10}$ alkyl, unbranched or branched, $C_1$-$C_{10}$ alkyl, unbranched or branched, with at least one functional group,
polyethylene glycol derivatives, polypropylene glycol derivatives, glycidyl, H—CO (formyl), unbranched or branched $C_1$-$C_{10}$ alkyl-CO, and $C_6$-$C_{10}$ aryl-CO.

4. The hyperbranched polyester comprising unsaturated groups as claimed in claim 1, wherein the at least one compound having at least one ethylenic double bond is selected from the group consisting of:
unsaturated carboxylic acids having 3 to 30 carbon atoms and from 1 to 5 C—C double bonds;
unsaturated alcohols having 3 to 40 carbon atoms and from 1 to 5 C—C double bonds;
unsaturated amines having 3 to 20 carbon atoms and from 1 to 5 C—C double bonds;
diol and polyol ethers in which at least one hydroxyl group is etherified with an unsaturated alcohol and at least one hydroxyl group is unetherified;
diol and polyol esters in which at least one hydroxyl group is esterified with an unsaturated acid and at least one hydroxyl group is unesterified;
vinyl esters, diene and triene monoepoxides;
unsaturated halides having 2 to 20 carbon atoms and from 1 to 5 C—C double bonds,
isocyanato (meth)acrylates; and
unsaturated halogenated silanes.

5. A process for preparing the hyperbranched polyester comprising unsaturated groups as claimed in claim 1, which comprises synthesizing at least one hyperbranched polyester by condensing:
a) at least one dicarboxylic acid or derivative thereof with at least one at least trifunctional alcohol; or
b) at least one tricarboxylic or higher polycarboxylic acid or derivative thereof with at least one diol;
and then reacting the synthesis product with (c) at least one compound having at least one ethylenically unsaturated double bond,
wherein
a molar ratio of hydroxyl groups of the at least one at least trifunctional alcohol or at least one diol to carboxyl groups of the at least one dicarboxylic acid or at least one tricarboxylic or higher polycarboxylic acid, respectively, is from 1.5/1 to 1/1.5.

6. A process for preparing the hyperbranched polyester comprising an unsaturated group as claimed in claim 1, which comprises synthesizing at least one hyperbranched polyester by condensing:
a) at least one dicarboxylic acid or derivative thereof with at least one at least trifunctional alcohol; or
b) at least one tricarboxylic or higher polycarboxylic acid or derivative thereof with at least one diol;
in the presence of (c) at least one compound having at least one ethylenically unsaturated double bond,
wherein
a molar ratio of hydroxyl groups of the at least one at least trifunctional alcohol or at least one diol to carboxyl groups of the at least one dicarboxylic acid or at least one tricarboxylic or higher polycarboxylic acid, respectively, is from 1.5/1 to 1/1.5.

7. A binder comprising a hyperbranched polyester comprising unsaturated groups as claimed in claim 1.

8. A process for preparing a radiation-curable composition, comprising:
using one or more hyperbranched polyesters comprising unsaturated groups as claimed in claim 1.

9. A radiation-curable composition comprising one or more hyperbranched polyesters comprising unsaturated groups as claimed in claim 1.

10. The hyperbranched polyester comprising ethylenically unsaturated groups according to claim 1, wherein the at least one dicarboxylic acid or derivative thereof is selected from the group consisting of succinic acid, glutaric acid, adipic acid, phthalic acid, isophthalic acid, terephthalic acid, monomethyl esters thereof, dimethyl esters thereof and mixture thereof.

11. The hyperbranched polyester comprising ethylenically unsaturated groups according to claim 1, wherein the at least one at least trifunctional alcohol is selected from the group consisting of glycerol, triglycerol, trimethylolpropane, trimethylolethane and pentaerythritol.

12. The hyperbranched polyester comprising ethylenically unsaturated groups according to claim 1, wherein the at least one tricarboxylic acid or derivative thereof is selected from the group consisting of 1,2,4-benzenetricarboxylic acid, 1,3,5-benzenetricarboxylic acid, 1,2,4,5-benzenetetracarboxylic acid, mellitic acid and derivatives thereof selected from the group consisting of corresponding anhydrides in monomeric or polymeric form and monoalkyl, dialkyl or trialkyl esters.

13. The hyperbranched polyester comprising ethylenically unsaturated groups according to claim 1, wherein the at least one diol is selected from the group consisting of ethylene glycol, propane-1,2-diol, propane-1,3-diol, butane-1,4-diol, hexane-1,6-diol, diethylene glycol, triethylene glycol, dipropylene glycol, and tripropylene glycol.

14. The hyperbranched polyester comprising ethylenically unsaturated groups according to claim 1, wherein a polydispersity is from 1.05 to 50.

15. The hyperbranched polyester comprising ethylenically unsaturated groups according to claim 1, wherein the at least one dicarboxylic acid is adipic acid and the at least one at least trifunctional alcohol is glycerol.

16. The hyperbranched polyester comprising ethylenically unsaturated groups according to claim 1, wherein the at least one dicarboxylic acid is adipic acid and the at least one at least trifunctional alcohol is trimethylolpropane.

17. The hyperbranched polyester comprising ethylenically unsaturated groups according to claim 1, wherein the at least one dicarboxylic acid is adipic acid and the at least one at least trifunctional alcohol is an ethoxylated trimethylolpropane having a formula of $CH_3CH_2C[CH_2(OCH_2CH_2)_5OH]_3$.

* * * * *